(12) United States Patent  (10) Patent No.: US 9,317,082 B2
Bates et al.                 (45) Date of Patent:     Apr. 19, 2016

(54) CONTROLLING OPERATION OF TEMPERATURE SENSORS (75) Inventors: Benjamin D. Bates, New Braunfels, TX (US); Brian E. Williams, Newmarket (CA); Stephen C. Ennis, Austin, TX (US)

(73) Assignees: Advanced Micro Devices, Inc., Sunnyvale, CA (US); ATI Technologies ULC, Markham (CA)

( * ) Notice: Subject to any disclaimer, the term of this patent is extended or adjusted under 35 U.S.C. 154(b) by 709 days.

(21) Appl. No.: 12/903,888

(22) Filed: Oct. 13, 2010

(65) Prior Publication Data

US 2012/0096288 A1   Apr. 19, 2012

(51) Int. Cl.
G06F 1/20 (2006.01)
G06F 1/32 (2006.01)

(52) U.S. Cl.
CPC ........... G06F 1/206 (2013.01); G06F 1/325 (2013.01); G06F 1/3206 (2013.01); G06F 1/3287 (2013.01); Y02B 60/1275 (2013.01); Y02B 60/1282 (2013.01)

(58) Field of Classification Search
USPC ............ 713/300–440; 718/100; 712/214
See application file for complete search history.

(56) References Cited

U.S. PATENT DOCUMENTS

| | | | |
|---|---|---|---|
| 5,490,059 A | 2/1996 | Mahalingaiah et al. | |
| 5,774,704 A | 6/1998 | Williams | |
| 7,243,243 B2 * | 7/2007 | Gedeon | 713/300 |
| 7,822,996 B2 * | 10/2010 | Watts, Jr. | 713/300 |
| 2003/0110012 A1 | 6/2003 | Orenstien et al. | |
| 2003/0110423 A1 * | 6/2003 | Helms et al. | 714/100 |
| 2006/0004538 A1 | 1/2006 | Cancel | |
| 2006/0248356 A1 | 11/2006 | Won et al. | |
| 2006/0253715 A1 | 11/2006 | Ghiasi et al. | |
| 2007/0061603 A1 | 3/2007 | Cox et al. | |
| 2007/0124609 A1 | 5/2007 | Lee | |
| 2007/0156370 A1 | 7/2007 | White et al. | |
| 2007/0159237 A1 * | 7/2007 | Zimlich | 327/539 |
| 2007/0217559 A1 * | 9/2007 | Stott et al. | 375/355 |
| 2007/0255972 A1 * | 11/2007 | Gaskins et al. | 713/500 |
| 2008/0005592 A1 | 1/2008 | Allarey et al. | |

(Continued)

FOREIGN PATENT DOCUMENTS

EP      1736851 A2    12/2006
WO   2006/037119 A2    6/2006

*Primary Examiner* — Tim T Vo
*Assistant Examiner* — Kim T. Huynh
(74) *Attorney, Agent, or Firm* — Meyertons, Hood, Kivlin, Kowert & Goetzel, P.C.

(57) ABSTRACT

Techniques are disclosed relating to controlling power consumption of temperature sensors in integrated circuits. In one embodiment, an integrated circuit is disclosed that includes a temperature sensor that is configured to determine a temperature of the integrated circuit. The integrated circuit also includes a sensor controller that is configured to vary power consumption of the temperature sensor based, at least in part, on the determined temperature. In some embodiments, the integrated circuit may determine a sampling rate of the temperature sensor based, at least in part, on the determined temperature and a temperature threshold of the integrated circuit. The integrated circuit may then vary the power consumption of the temperature sensor by periodically disabling the temperature sensor based on the determined sampling rate. In some embodiments, the integrated circuit may also vary the power consumption of the temperature sensor based on the operating state of one or more processing cores in the integrated circuit.

19 Claims, 6 Drawing Sheets

(56) References Cited

U.S. PATENT DOCUMENTS

| | | |
|---|---|---|
| 2008/0022140 A1 | 1/2008 | Yamada et al. |
| 2008/0317086 A1* | 12/2008 | Santos et al. .................. 374/1 |
| 2009/0182986 A1* | 7/2009 | Schwinn et al. .............. 712/214 |
| 2009/0235108 A1 | 9/2009 | Gold et al. |
| 2010/0013543 A1 | 1/2010 | Kang |

* cited by examiner

CONTROLLING OPERATION OF TEMPERATURE SENSORS

BACKGROUND

1. Technical Field

This disclosure relates generally to integrated circuits, and, more specifically, to power management within integrated circuits.

2. Description of the Related Art

As processing demands for processors increase, power consumption and heat dissipation have become an important concern in processor design. Designers typically create processors that are designed to operate in predetermined temperature and power ranges. To ensure operation within its specified range, a processor may include sensors that measure temperature during operation.

Temperature information may be used by a processor for a variety of purposes. Initially, temperature information was used to determine whether a processor was overheating (and thus needed to be powered down). More complex processors may use temperature information to determine permissible operating states. For example, a processor may determine, based on a temperature sensor indicating that a measured temperature of a processor is below a predetermined threshold, to begin operating in an overclocking state until the measured temperature exceeds the threshold.

SUMMARY OF THE EMBODIMENTS

Various embodiments of structures and methods that allow a processor to control operation of temperature sensors are disclosed herein.

In one embodiment, an integrated circuit is disclosed that includes a first temperature sensor configured to determine a first temperature of the integrated circuit. The integrated circuit is configured to vary power consumption of the first temperature sensor based, at least in part, on the determined first temperature.

In another embodiment, an integrated circuit is disclosed that includes a first temperature sensor configured to determine a temperature of the integrated circuit. The integrated circuit is configured to vary a sampling rate of the first temperature sensor based, at least in part, on the determined temperature.

In yet another embodiment, a method is disclosed. The method includes a first temperature sensor measuring a temperature of an integrated circuit, and the integrated circuit determining a delay interval between measuring the temperature and measuring a subsequent temperature. The delay interval is determined based, at least in part, on the measured temperature. The method further includes the integrated circuit disabling the first temperature sensor for at least a portion of the determined delay interval.

In still another embodiment, a computer readable storage medium is disclosed. The computer readable storage medium includes a data structure which is operated upon by a program executable on a computer system, the program operating on the data structure to perform a portion of a process to fabricate an integrated circuit including circuitry described by the data structure. The circuitry described in the data structure includes a sensor controller configured to receive temperature information from a temperature sensor, where the temperature sensor is configured to determine a temperature of the integrated circuit. The sensor controller is configured to vary power consumption of the temperature sensor based, at least in part, on the received temperature information.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to, e.g., logical processing elements 0 and 1.

"Temperature Sensor." This term has its ordinary and accepted meaning in the art, and includes circuitry that is configured to measure a temperature. As will be described below, temperature sensors may measure temperatures of various structures on a processor.

"Sampling rate." As used herein, this term refers to the rate at which a temperature sensor samples a temperature of a processor. For example, in one embodiment, a temperature sensor may have sampling rate of 50 samples per second, i.e., the temperature sensor samples a temperature every 20 ms.

"Delay Interval." As used herein, this term refers to the time between sampling two temperatures. For example, the temperature sensor described above would have a delay interval of 20 ms. Note that a delay interval is the inverse of a sampling rate.

"Varying a Sampling Rate/Delay Interval." As used herein, this phrase refers to performing an action that causes a sampling rate or a delay interval to change (the sampling rate and delay interval are reciprocals of one another). For example, disabling and enabling a temperature sensor may be described as varying the sampling rate (and delay interval) of that sensor. Adjusting the sampling rate of an analog-to-digital converter (ADC) used by a temperature sensor to sample temperatures may also be described as varying the sampling rate and delay interval of that sensor.

"Power Consumption." This term has its ordinary and accepted meaning in the art, and includes an amount of power being used by a structure of a processor (e.g., an amount of mW used by a temperature sensor).

"Disabling." As used herein, this term refers to restricting power supplied to a structure (e.g., a temperature sensor) in a processor to inhibit operation of that structure. The term "disabling" may include causing a structure to be supplied with no power, or include causing a reduction of power to a point that it inhibits operation of the structure. For example, a temperature sensor may be described as being "disabled" if it is unable to measure a temperature because it has insufficient power. Alternatively, "enabling," as used herein, refers to supplying power to a structure to permit operation of that structure.

Certain prior processor implementations reduce power by operating at a lower clock frequency, operate at a lower power state, etc., but do not vary operation of the temperature sensors. The present disclosure recognizes that temperature sensors consume power, and that processor power consumption may be reduced by controlling the power consumption of these sensors.

Accordingly, the present disclosure describes techniques for reducing activity (and thus the power consumption) of temperature sensors on an integrated circuit. In one embodiment, a integrated circuit is disclosed that includes a sensor controller that is configured to control power consumption of one or more temperature sensors. In various embodiments, the sensor controller is configured to periodically cycle sensors between enabled and disabled states (i.e., states in which the sensors measure or do not measure temperatures) based on temperatures determined by those sensors. For example, in one embodiment, the sensor controller operates one or more sensors in an enabled state while they are measuring temperatures that are above a certain threshold. (This threshold may be set to ensure that a safe margin exists between the temperatures being measured and the maximum permitted operating temperature for the integrated circuit.) Once the sensors begin to measure temperatures that are below the threshold, the sensor controller, in one embodiment, may begin to cycle the sensors between the enabled and disabled states, where the time that sensors remain in a disabled state is determined based on the temperatures being determined by the sensors. As the temperatures being measured by a given sensor decrease, the sensor controller, in one embodiment, is configured to increase the time that a sensor remains in a disabled state. If the measured temperatures begin increasing, the sensor controller, in one embodiment, is configured to decrease the time that a sensor remains in a disabled state. By cycling sensors between an enabled and disabled states, the integrated circuit, in some instances, can cause those sensors to consume less power than if those sensors were always enabled.

The description is applicable to any integrated circuit that includes a temperature sensor, including any suitable type of processor (as described further below). Thus, while the description below is presented in terms of a processor, the description is also intended to cover integrated circuits generally, particularly those that include temperature sensors and for which power management is desired.

Figure 1:
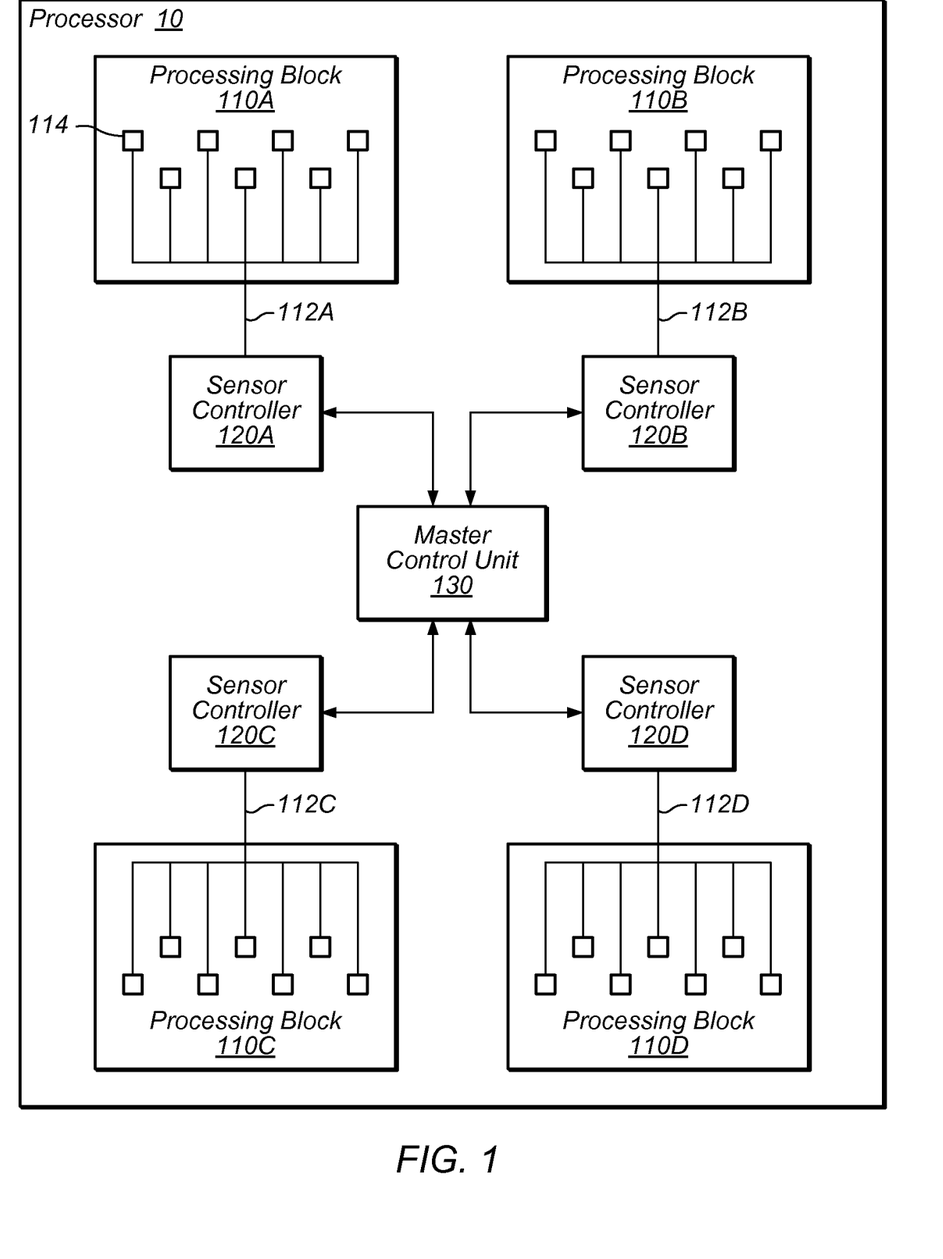
FIG. 1 is a block diagram illustrating one embodiment of a processor configured to control power consumption of temperature sensors.

Turning now to FIG. 1, a block diagram of a processor 10 is depicted. Processor 10 is one embodiment of a processor that is configured to control power consumption of temperature sensors. In the illustrated embodiment, processor 10 includes processing blocks 110A-D, which each includes a respective one of temperature sensors networks 112A-D with temperature sensors 114. Each network 112 is coupled to a respective one of sensor controllers 120A-D, which, in turn, is coupled to master control unit 130. In various embodiments, processor 10 may include more (or less) elements 110-130 than shown. In some embodiments, functionality of master control unit 130 may not be concentrated within a single unit 130 but rather divided among separate units in processor 10—e.g., among sensor controllers 120.

Processor 10 may represent any suitable processor. In one embodiment, processor 10 is a general-purpose processor such as a central processing unit (CPU). In some embodiments, processor 10 is a special-purpose processor such as an accelerated processing unit (APU), digital signal processor (DSP), graphics processing unit (GPU), etc. In some embodiments, processor 10 is acceleration logic such as an application-specific integrated circuit (ASIC), field-programmable gate array (FPGA), etc. In one embodiment, processor 10 is a multi-threaded superscalar processor. In one embodiment, processor 10 includes a plurality of multi-threaded execution cores (processing elements) that are configured to operate independently of one another.

Processing blocks 110 may represent any suitable structure within processor 10. In one embodiment, processing blocks 110 include execution cores of processor 10. In some embodiments, processing blocks 110 include structures within an execution pipeline such as fetch units, decode units, functional units, retirement units, etc. In some embodiments, processing blocks 110 include memory storage structures such as register banks, caches, etc. In some embodiments, processing blocks 110 may include structures that are known to be significant heat sources such as those used to facilitate out-of-order execution such as branch prediction units, register renaming units, etc.

Temperature sensor networks 112, in one embodiment, are networks of one or more temperature sensors 114 that are configured to measure temperatures in processing blocks 110. Temperature sensors 114 may be arranged in any suitable manner within a block 110. In one embodiment, temperature sensors 114 may be evenly interspersed in a processing block 110 to calculate an average temperature of a block 110. In another embodiment, temperature sensors 114 may be concentrated in areas that are likely to be significant sources of heat. Temperature sensors 114 may use any suitable techniques to measure temperatures. In one embodiment, temperature sensors 114 are configured to determine temperatures of blocks 110 using thermal diodes. For example, in some embodiments, a temperature sensor 114 is configured to determine temperatures by applying a voltage to a thermal diode and measuring the resistance of the diode, where the resistance varies proportionally to the temperature being measured. In various embodiments, temperature sensor networks 112 are configured to provide determined temperatures to sensor controllers 120.

Sensor controllers 120, in one embodiment, are configured to control power consumption of sensor networks 112 based, at least in part, on temperatures determined by temperature sensors 114. As will be described below, in one embodiment, sensor controllers 120 are configured to control power consumption of sensors 114 by cycling sensors 114 between enabled and disabled states (i.e., enabling and disabling sensors 114) based on temperatures determined by those sensors 114. In some embodiments, sensor controllers 120 are configured to operate one or more sensors 114 in an enabled state in response to the sensors 114 measuring temperatures that are above a threshold that is determined based on a maximum temperature for processor 10 (or specific structures within processor 10). In one embodiment, if sensors 114 begin to measure temperatures that are below the threshold, the sensor controllers 120 are configured to cycle sensors 114 between the enabled and disabled states, where the time that sensors 114 remain in a disabled state is determined based on the temperatures being determined by sensors 114. As the temperatures being measured by a given sensor 114 decrease, a sensor controller 120, in one embodiment, is configured to increase the delay interval (i.e., time between sampling two temperatures) for that sensor 114. Once the measured temperatures begin increasing, the sensor controller 120, in one embodiment, is configured to decrease the delay interval for that sensor 114. As discussed above, this process of enabling and disabling a sensor 114 may be referred to herein as "varying the sampling rate," or "varying the delay interval."

In some embodiments, sensor controllers 120 may be configured to control power consumption of sensors 114 by varying the sampling rates of analog-to-digital converters (ADC) in sensors 114 based, at least in part, on determined temperatures. As will be described below, sensors 114 may be configured to measure a temperature by sampling an analog signal (e.g., a voltage drop across a temperature diode) using an ADC. In some embodiments, ADCs of sensors 114 may be configured to sample analog signals at fixed rates. In other embodiments, ADCs of sensors 114 are configured to sample analog signals at rates that are adjustable by a sensor controller 120. For example, in one embodiment, sensor controllers 120 are configured to lower (or raise) sampling rates of sensors 114 proportional to a decrease (or increase) in temperatures determined by those sensors 114.

In one embodiment, a sensor controller 120 is configured to use a delay interval (or sampling rate) for a given sensor 114 that is based on temperatures measured by that sensor 114. Thus, at a given point in time, different sensors 114 measuring different temperatures may have different delay intervals/ sampling rates. In another embodiment, sensor controllers 120 are configured to use a common (i.e., the same) delay interval/sampling rate for a group of sensors 114. For example, in some embodiments, a sensor controller 120 may be configured to cycle sensors 114 between enabled and disabled states by enabling and disabling an entire network 112 (or portions of a network 112). In one embodiment, sensor controllers 120 are configured to use a common delay interval that is based on an average temperature measured by a group of sensors 114. In one embodiment, sensor controllers 120 are configured to use a common delay interval that is based on a maximum temperature measured by a group of sensors 114. In various embodiments, sensor controllers 120 are configured to calculate delay intervals/sampling rates for sensors 114. In other embodiments, delay intervals/sampling rates are calculated by master control unit 130 described next. Sensor controllers 120 are further described below in conjunction with FIGS. 5 and 6.

Master control unit 130, in one embodiment, is configured to manage various aspects of processor 10 based, at least in part, on temperatures determined by sensors 114. In one embodiment, master control unit 130 is configured to use the determined temperatures to regulate processor 10's operating frequencies and/or power consumption by controlling a value indicative of an operating state of processor 10 (or processing core within processor 10). In one embodiment, an operating state may be either a power state or a performance state. In some embodiments, processor 10 may support power states and/or performance states that correspond respectively to "C" and "P" states defined by the advanced configuration and power interface (ACPI) standard. A power state may indicate, for example, whether processor 10 is fully operational, or is powered down in whole or part. For example, in one embodiment, if some processing demand for processor 10 exists, processor 10 may operate at a power state that permits execution of instructions; such a state may be referred to as power state C0. If little or no demand for processor 10 exists, processor 10, in one embodiment, may operate at a lower power state such as a halted state or a stop-clock state; such states may be referred to as power states C1 or C2 respectively. Thus, a power state may refer to a state in which processor 10 is fully operational (i.e., executing instructions) or one of plurality of different idle state in which processor 10 is not executing instructions.

A performance state is a state in which processor 10 is executing instructions (e.g., operating at a power state C0) at a particular voltage/frequency. For example, in one embodiment, if significant processing demands exist, processor 10 may operate at its highest performance state, which may be referred to as performance state P0. In such an embodiment, P0 corresponds to a maximum operating frequency and highest power setting of processor 10. If lesser demands exist, processor 10 may operate at a lower performance state (e.g., performance state P1, P2, etc.), where processor 10 operates at lower operating frequencies and lower power settings.

In one embodiment, master control unit 130 is configured to determine delay intervals/sampling rates for sensor controllers 120 based, at least in part, on temperature information provided by sensor controllers 120. In some embodiments, master control unit 130 is configured to assign a respective delay interval/sampling rate to each sensor 114, e.g., based on temperatures measured by that sensor 114 and/or one or more adjacent sensors 114. In other embodiments, master control unit 130 is configured to assign common delay intervals/ sampling rates to groups of sensors 114. For example, in one embodiment, master control unit 130 may be configured to assign a respective delay interval/sampling rate to each network 112. In some embodiments, master control unit 130 may be configured to determine delay intervals/sampling rates based on an average and/or maximum temperature measured by a group of sensors 114.

In some embodiments, master control unit 130 is configured to determine delay intervals/sampling rates based, at least in part, on operating states of processor 10 (or processing cores with processor 10). In one embodiment, master control unit 130 is configured to determine delay intervals/sampling rates based on performance states. For example, master control unit 130 may select lower delay intervals (or higher sampling rates) for sensors 114 in a core if that core is operating at higher performance states (e.g., performance state P0) than at lower performance states (e.g., performance state P2). In one embodiment, master control unit 130 may be configured to determine delay intervals/sampling rates based on power states. In some embodiments, master control unit 130 may be further configured to permanently disable one or more sensors 114 (as opposed to cycling between enabled and disabled states) while processor 10 is at certain operating states. For example, in one embodiment, if a core of processor 10 transitions to a power state that is below a certain threshold (e.g., a power state of C1 or lower power state), master control unit 130 may be configured to disable sensors 114 in that core while the core remains in that power state. If that core subsequently transitions to a higher power state, master control unit 130 may be configured to re-enable the sensors 114 in that core. Master control unit 130 is described further below in conjunction with FIGS. 2-4.

By varying the power consumption of sensors 114 (e.g., by enabling and disabling sensors 114, by changing ADC sampling rates, etc.), processor 10 can reduce the activity of sensors 114 and thus reduce the power consumption of sensors 114, sensor controllers 120, and master control unit 130. As a result, processor 10, in some instances, may consume less power than other processors that do not vary power consumption of temperature sensors.

Figure 2:
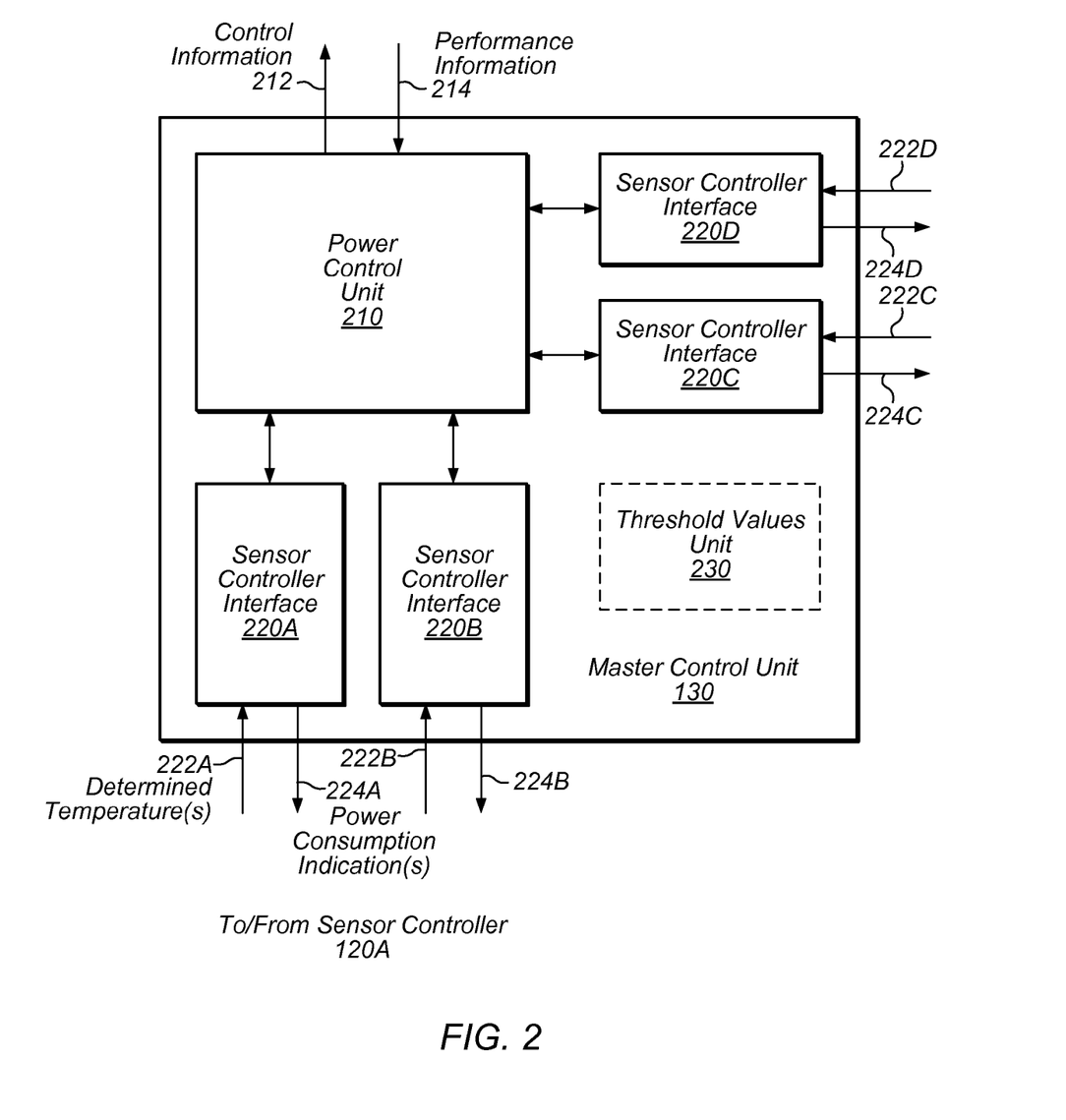
FIG. 2 is a block diagram illustrating one embodiment of a master control unit.

Turning now to FIG. 2, a block diagram of a master control unit 130 is depicted. In the illustrated embodiment, master control unit 130 includes a power control unit 210, sensor controller interfaces 220A-D, and threshold values unit 230. In some embodiments, master control unit 130 may include a different number of interfaces 220. In some embodiments, master control unit 130 may include power control unit 210.

Power control unit 210, in one embodiment, is configured to manage processor 10's selection of operating states based, at least in part, on temperatures determined by sensors 114. In the illustrated embodiment, power control unit 210 is configured to provide control information 212 and to receive performance information 214. In one embodiment, control information 212 specifies operating states (e.g., power states and/or performance states) that may be used by processor 10. For example, in one embodiment, power control unit 210 may be configured to determine that a particular core of processor 10 is exceeding a maximum temperature threshold. If that core is operating, e.g., at performance state P0, power control unit 210, in one embodiment, may provide control information 212 specifying that the core is not permitted to operate in state P0 until some condition is satisfied (e.g., one or more temperatures decrease). In one embodiment, performance information 214 specifies one or more operating states currently being used by processor 10 (or cores within processor 10). In one embodiment, power control unit 210 is configured to receive performance information 214 from an operating system executing on processor 10 that selects operating states for processor 10 based on processing demands.

Sensor controller interfaces 220, in one embodiment, are configured to determine delay intervals/sampling rates for sensors 114. In the illustrated embodiment, sensor controller interfaces 220 are configured to receive one or more determined temperatures 222 from a respective one of sensor controllers 120 and to provide one or more corresponding power consumption indications 224 to that respective sensor controller 120. In one embodiment, determined temperatures 222 may include temperatures determined by each sensor 114 in a given network 112. In other embodiments, determined temperatures 222 include an average temperature and/or a maximum temperature that is determined based on temperatures measured by a group of sensors 114. In one embodiment, sensor controller interfaces 220 are configured to provide power consumption indications 224 based on determined temperatures 222. In some embodiments, sensor controller interfaces 220 are configured to provide power consumption indications based on operating states specified by performance information 214. In one embodiment, power consumption indications 224 include delay intervals that are to be used by sensors 114. In one embodiment, power consumption indications 224 include sampling rates that are to be used by sensors 114. In some embodiments, power consumption indications 224 include instructions specifying that one or more sensors 114 are to be disabled or enabled. In one embodiment, a sensor controller interface 220 may be configured to provide a respective power consumption indication 224 for each sensor 114 in a given network 112. In other embodiments, a sensor controller interface 220 may be configured to provide a power consumption indication 224 for a group of sensors 114—e.g., each sensor 114 in a given network 112.

As will be described below, in some embodiments, sensor controller interfaces 220 may be configured to calculate a delay interval/sampling rate based on determined temperatures and one or more predetermined values stored by processor 10. For example, in one embodiment, sensor controller interfaces 220 are configured to determine a given delay interval (referred to herein as $t_{Delay}$) based on the values $m_{Delta}$, $T_{Threshold}$, $T_{Latest}$, and $t_{DelayMin}$. These values are defined herein as follows:

$m_{Delta}$: a rate of change specifying the change in a delay interval relative to a change in temperature—e.g., ms/° C.;

$T_{Threshold}$: the threshold temperature at which a sensor controller 120 begins to cycle power of a sensor 114; this temperature may be selected to ensure that a safe margin exists between the temperatures being measured and a maximum temperature threshold for processor 10 (In this way, sensors 114 have sufficient time to detect a sudden spike in temperature and cause corrective actions to be taken.);

$T_{Latest}$: the latest determined temperature received by interface 220; and $t_{DelayMin}$: a minimum threshold for a delay interval.

One example of a specific formula using $m_{Delta}$, $T_{Threshold}$, $T_{Latest}$, and $t_{DelayMin}$ is described in more detail below with respect to FIG. 3. In illustrated embodiment, sensor controller interfaces 220 are configured to read these values from threshold values unit 230 described next. Sensor controller interfaces 220 are further described in conjunction with FIGS. 3 and 4.

Threshold values unit 230, in one embodiment, is circuitry that is configured to store values that are used by sensor controller interfaces 220 to determine delay intervals/sampling rates. In one embodiment, threshold values unit 230 includes one or more registers that are configured to store values that may be changeable, e.g., through settings in a system BIOS. In another embodiment, threshold values unit 230 stores values using fuses that are blown during fabrication of processor 10 to set the values. In other embodiments, threshold values unit 230 may be configured to store values using other techniques.

Figure 3:
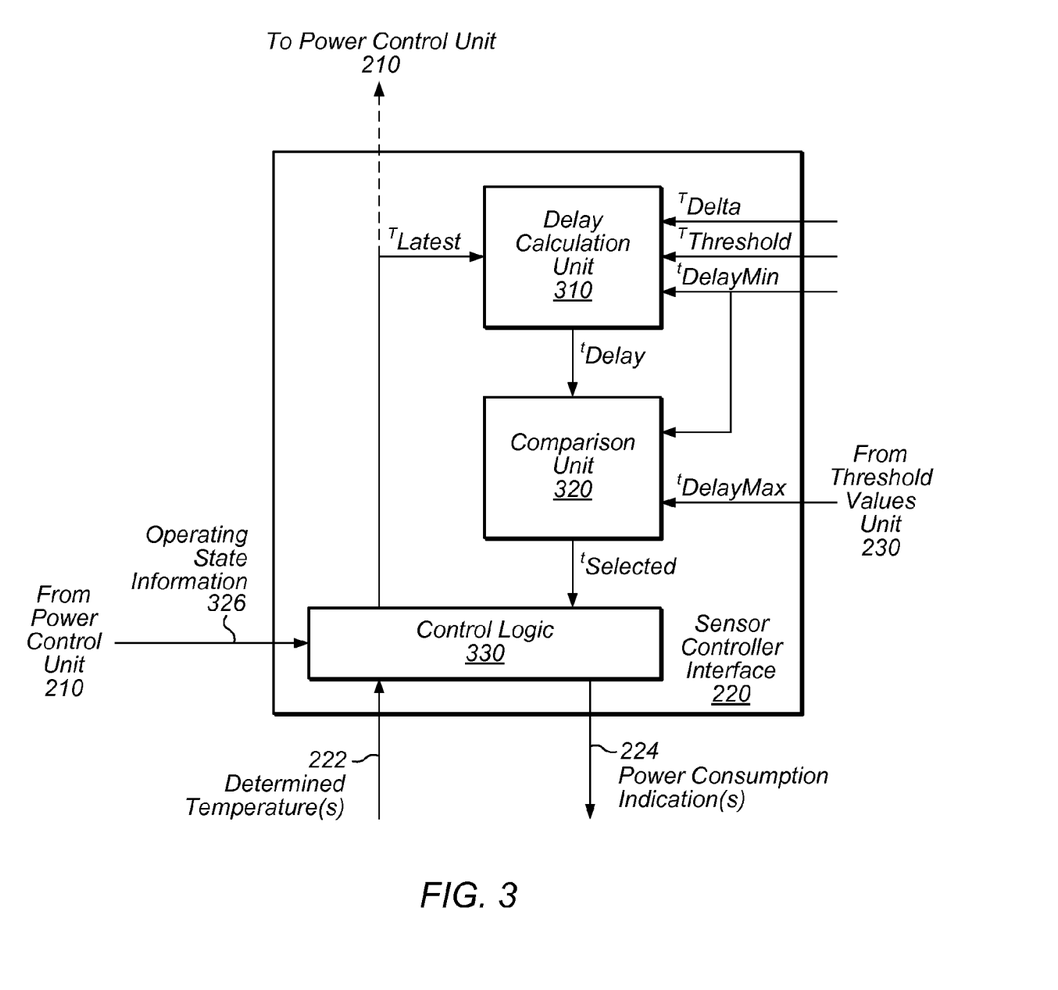
FIG. 3 is a block diagram illustrating one embodiment of a sensor controller interface.

Turning now to FIG. 3, a block diagram of a sensor controller interface 220 is depicted. In the illustrated embodiment, sensor controller interface 220 is configured to calculate a delay interval based, at least in part, on determined temperatures 222. (In another embodiment, sensor controller 220 may be configured to calculate a sampling rate based, at least in part, on determined temperatures 222.) As shown, sensor controller interface 220 includes delay calculation unit 310, comparison unit 320, and control logic 330.

Delay calculation unit 310, in one embodiment, includes logic that is configured to calculate $t_{Delay}$ by performing $m_{Delta}*(T_{Threshold}-T_{Latest})+t_{DelayMin}$. In one embodiment, unit 310 may be configured to receive $m_{Delta}$, $T_{Threshold}$, and $t_{DelayMin}$ from threshold values unit 230. In the illustrated embodiment, unit 310 is configured to receive $T_{Latest}$ from control logic 330 described below. In one embodiment, $T_{Latest}$ may be a temperature determined by a given sensor 114. In some embodiment, $T_{Latest}$ may be an average or maximum temperature calculated for a group of sensors 114.

Comparison unit 320, in one embodiment, includes logic that is configured to determine whether a calculated $t_{Delay}$ is between $t_{DelayMin}$ and $t_{DelayMax}$. As used herein, $t_{DelayMax}$ is a maximum threshold for a delay interval. In one embodiment, if comparison unit 320 determines that a calculated $t_{Delay}$ is between $t_{DelayMin}$ and $t_{DelayMax}$, unit 320 is configured to provide $t_{Delay}$ to control logic 330 as $t_{Selected}$. If comparison unit 320 determines that a calculated $t_{Delay}$ exceeds $t_{DelayMax}$, unit 320, in one embodiment, may be configured to provide $t_{DelayMax}$ to interface logic 330 as $t_{Selected}$. If comparison unit 320 determines that a calculated $t_{Delay}$ is less than $t_{DelayMin}$, unit 320, in one embodiment, may be configured to specify a zero delay interval as $t_{Selected}$, where specifying a zero delay interval causes a sensor controller 120 to not disable a sensor 114 (or sensors 114). An example showing a calculation of a delay interval is described below in conjunction with FIG. 4.

Control logic 330, in one embodiment, is configured to manage operation of interface 220. In the illustrated embodiment, control logic 330 is configured to receive determined temperatures 222 and provide a corresponding $T_{Latest}$ to delay calculation unit 310. In some embodiments, control logic 330 may also be configured to provide $T_{Latest}$ to power control unit 210 for use in regulating operating states of processor 10. In the illustrated embodiment, control logic 330 is further configured to receive $t_{Selected}$ from comparison unit 320 and operating state information 326 from power control unit 210. (In various embodiments, operating state information 326 specifies one or more operating states being used by processor 10 (or processing cores with processor 10).) In the illustrated embodiment, control logic 330 is configured to provide power consumption indications 224 based on information 326 and $t_{Selected}$.

Figure 4:
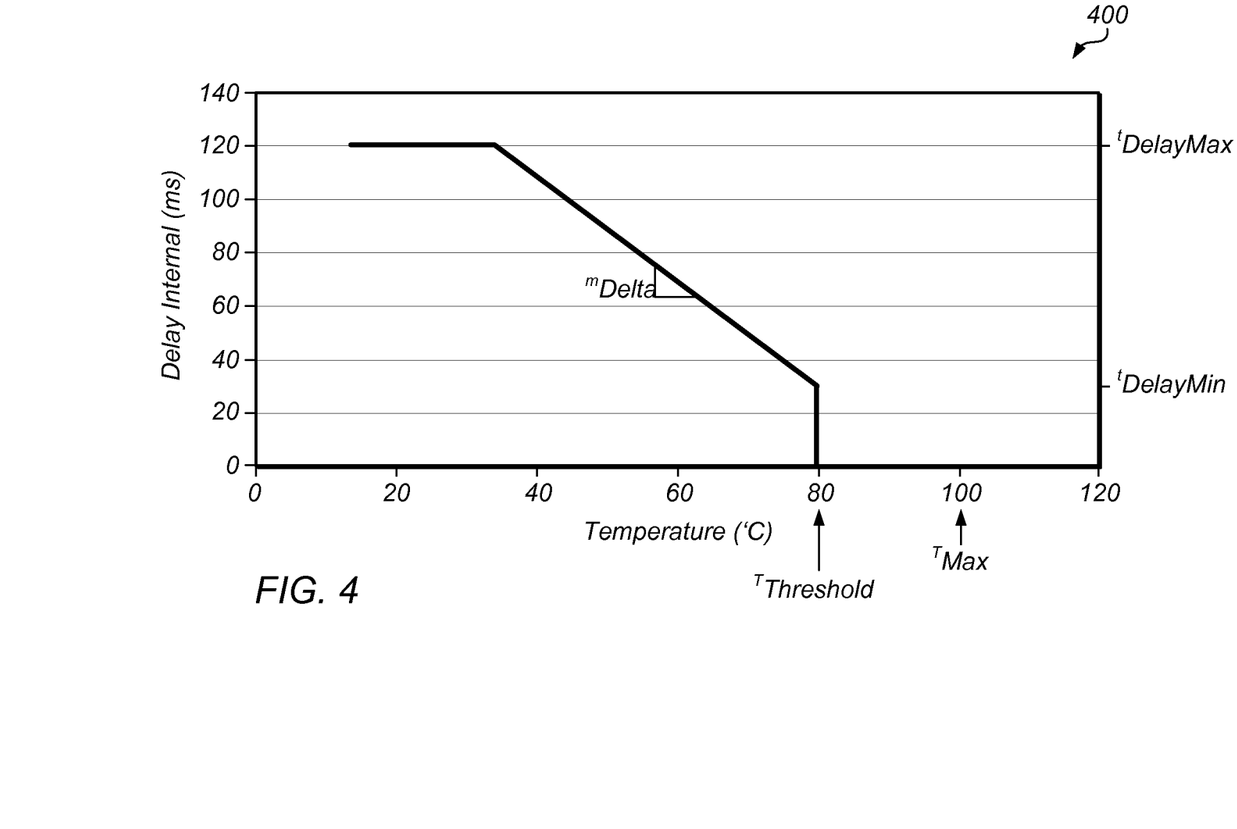
FIG. 4 is a graph illustrating an exemplary relationship between delay intervals and determined temperatures.

Turning now to FIG. 4, a graph illustrating an exemplary relationship between delay intervals and determined temperatures is depicted. In graph 400, the horizontal axis represents one embodiment of possible temperatures for $T_{Latest}$ ranging from 0° C. to 120° C. The vertical axis of graph 400 represents one embodiment of possible delay intervals for $t_{Delay}$, ranging from 0 ms to 140 ms. In this example, the maximum temperature threshold for processor 10 (referred to as $T_{Max}$) is 100° C. A $T_{Threshold}$ of 80° C. is selected in this embodiment to have 20° C. safety margin. Once $T_{Latest}$ is below 80° C., sensor controller 120, in one embodiment, begins to cycle that sensor using a delay interval of 30 ms for $t_{DelayMin}$. As temperatures decrease, sensor controller 120, in one embodiment, decreases $t_{Delay}$ at a $m_{Delta}$ of 2 ms per 1° C. until $t_{Delay}$ reaches a $t_{DelayMax}$ of 120 ms at a $T_{Latest}$ of 35° C. In one embodiment, if $T_{Latest}$ falls below 35° C., sensor controller 120 continues to use a $t_{Delay}$ of 120 ms. In some embodiments, if processor 10 transitions a core that includes the sensor 114 to an idle power state, sensor controller 120 may disable that sensor 114 while the core is in that state.

Figure 5:
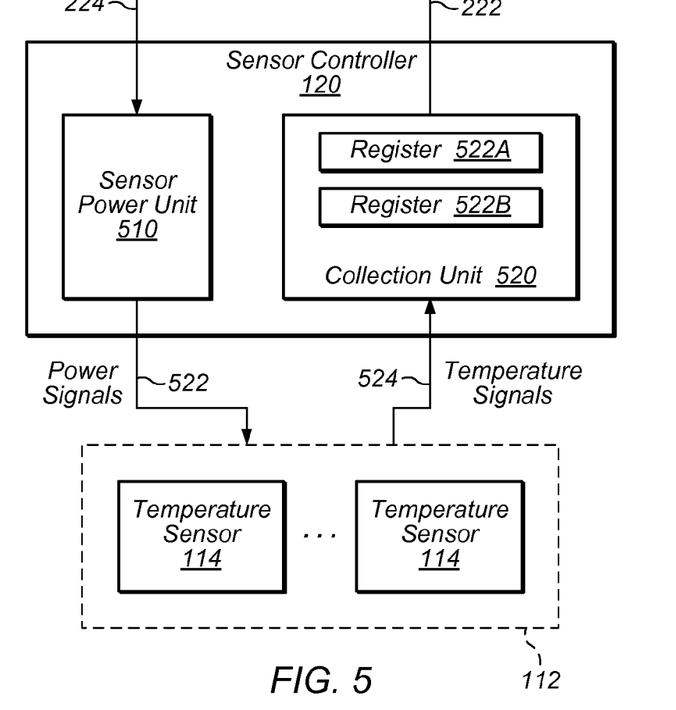
FIG. 5 is a block diagram illustrating one embodiment of a sensor controller.

Turning now to FIG. 5, a block diagram of a sensor controller 120 is depicted. As noted above, sensor controller 120 is one embodiment of a controller that is configured to control power consumption of one or more sensors 114. In the illustrated embodiment, sensor controller 120 includes sensor power unit 510 and collection unit 520, which, in turn, includes registers 522A and 522B. In some embodiments, collection unit 520 may include greater or fewer registers 522.

Sensor power unit 510, in one embodiment, is configured to enable and disable sensors 114 based on power consumption indications 224. In one embodiment, sensor power unit 510 is configured to enable and disable sensors 114 based on sampling rates/delay intervals specified by indications 224. For example, in one embodiment, if a delay interval of 30 ms is specified, sensor power unit 510 may be configured to disable one or more sensors 114 for 30 ms and to then enable them to determine one or more temperatures. In some embodiments, sensor power unit 510 is also configured to enable and disable sensors 114 based on indications 224 specifying instructions to enable/disable sensors 114. (As noted above, a sensor controller interface 220 may provide such an instruction based on an operating state of processor 10.)

In the illustrated embodiment, sensor power unit 510 is configured to enable/disable temperature sensors 114 in a network 112 by providing power signals 522. In one embodiment, power signals 522 are one or more voltages that are used to power sensors 114. By providing or restricting the voltages, sensor power unit 510, in one embodiment, can enable or disable sensors 114. In another embodiment, power signals 522 are signals that cause voltages used by sensors 114 to be provided or restricted.

In some embodiments, sensor power unit 510 may be configured to adjust the sampling rates of ADCs in sensors 114 based on sampling rates/delay intervals specified by power consumption indications 224. (As noted above, in one embodiment, sensors 114 may determine temperatures by sampling an analog voltage signal using an ADC that has an adjustable rate.) In one embodiment, sensor power unit 510 is configured to provide power signals 522 that include instructions to cause sensors 114 to change their ADC sampling rates. Sensor power unit 510 is further described below in conjunction with FIG. 6.

Collection unit 520, in one embodiment, is configured to collect temperatures determined by sensors 114. In the illustrated embodiment, collection unit 520 is configured to receive temperature signals 514 and to provide determined temperatures 222. In one embodiment, temperature signals 514 are digital signals that specify determined temperature values. In another embodiment, temperature signals 514 are analog signals that are sampled by collection unit 520 to determine digital temperature values. In one embodiment, collection unit 520 is configured to store collected temperatures in registers 522. In one embodiment, collection unit 520 provides the temperatures specified by signals 514 as determined temperatures 222. In some embodiments, collection unit 520 may be configured to analyze temperatures specified by signals 514 to determine average and/or maximum temperatures, which are then provided as determined temperatures 222.

Figure 6:
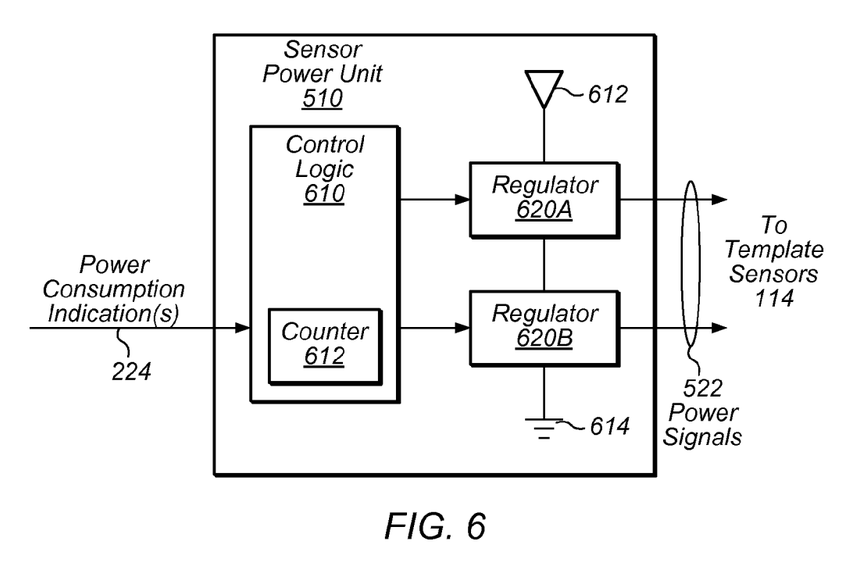
FIG. 6 is a block diagram illustrating one embodiment of a sensor power unit.

Turning now to FIG. 6, a block diagram of a sensor power unit 510 is depicted. In the illustrated embodiment, sensor power unit 510 includes control logic 610 and regulators 620A and 620B, which are coupled to a power source 622 and a ground source 612. In some embodiments, sensor power unit 510 may include greater or fewer regulators 620.

Control logic 610, in one embodiment, is configured to manage operation of sensor power unit 510. In one embodiment, control logic 610 is configured to enable and disable sensors 114 by instructing regulators 620 to provide or restrict power supplied to sensors 114. In one embodiment, control logic 610 is configured to instruct regulators 620 based on delay intervals or sampling rates specified by power consumption indications 224. In some embodiment, control logic 610 uses counter 612 to determine when to enable or disable sensors 114. For example, in one embodiment, control logic 610 may be configured to initialize counter 612 upon disabling one or more sensors 114. Control logic 610 may then increment counter 612 while the sensors 114 are disabled. Once counter 612 reaches, e.g., a specified delay interval, control logic 610, in one embodiment, instructs regulators to enable the sensors 114 to sample one or more temperatures. In some embodiments, control logic 610 may be configured to repeat this process of enabling and disabling sensors 114 until new power consumption indications 224 are received.

Regulators 620, in one embodiment, are configured to supply power from power source 612 to sensors 114. In some embodiments, when sensors 114 are enabled, regulators 620 may be configured to provide different voltages (e.g., as power signals 522) that are used to power different structures within sensors 114 such as temperature sensing diodes, ADCs, etc. For example, regulators 610 may be configured to regulate an input voltage (e.g., 5V) from power source 612 to produce output voltages (e.g., 3.3V and 1.6V) as power signals 522. If regulators 620 receive an instruction to disable sensors 114, regulators 620, in one embodiment, are configured to restrict power being supplied to those sensors 114. In some embodiments, regulators 620 are configured to restrict power by driving the supplied voltages to ground. In other embodiments, regulators 620 are configured to restrict power to cause sensor 114 to be disabled without actually driving the supplied voltages completely to ground. For example, in one embodiment, regulators may be configured to provide a first current (e.g., 14 mA) when a sensor 114 is enabled and a minimal current (e.g., less than 1 mA) when the sensor 114 is disabled.

When power is initially supplied to a sensor 114 by regulators 620, the sensor 114, in one embodiment, may be configured to perform an initialization procedure prior to being able to determined temperatures. In some embodiments, this initialization procedure may include initializing ADCs, registers that store determined temperature information, and/or other circuits that are used by sensors 114. Once this initialization procedure is complete, a sensor 114 may begin determining temperatures. In various embodiments, a sensor 114 may perform an initialization procedure each time it is enabled after being disabled.

Figure 7:
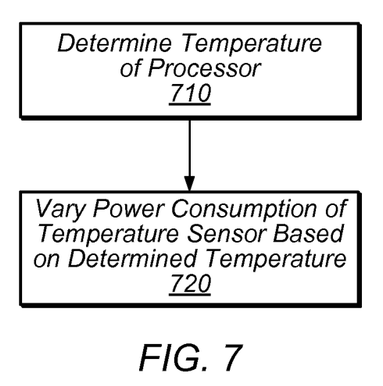
FIG. 7 is a flow diagram illustrating one embodiment of a method for controlling power consumption of a temperature sensor based, at least in part, on a determined temperature of a processor.

Turning now to FIG. 7, a flow diagram of a method 700 is depicted. Method 700, which may be performed by processor 10 in one embodiment, is a method for controlling power consumption of a temperature sensor. In some instances, performing method 700 may reduce power consumption of processor 10 by reducing the activity (and thus power consumption) of one or more sensors 114.

In step 710, a temperature sensor (e.g., a temperature sensor 114) determines a temperature of processor 10. The temperature sensor may measure a temperature of any suitable structure within processor 10. In one embodiment, the temperature sensor measures the temperature of one or more processing cores within processor 10. In some embodiments, the temperature sensor measures a temperature of a structure within an execution pipeline such as a fetch unit, decode unit, functional unit, retirement unit, etc. In some embodiments, the temperature sensor measures a temperature of a memory structure such as a register bank, a cache, etc. The temperature sensor may use any suitable technique to determine the temperature. In one embodiment, the temperature sensor may determine the temperature using a thermal diode.

In step 720, processor 10 varies power consumption of the temperature sensor based on the determined temperature. In one embodiment, processor 10 (e.g., using sensor controller 120) varies the power consumption by enabling and disabling the temperature sensor based on a calculated sampling rate/delay interval. In other embodiments, processor 10 varies the power consumption by changing the sampling rate/delay interval of an ADC used by the temperature sensor to determine temperatures. In various embodiments, processor 10 determines the sampling rate/delay interval based on the temperature determined in step 710 and/or temperatures determined by other temperature sensors within processor 10. For example, in some embodiments, the sampling rate/delay interval may be determined based on an average and/or maximum temperature determined by a group of temperature sensors.

In one embodiment, processor 10 begins varying the power consumption of the temperature sensor in response determining that the temperature determined in step 710 is below a certain threshold. As subsequent temperatures are determined by the temperature sensor, processor 10, in one embodiment, increases or decreases the sampling rate/delay interval based on increases or decreases in the determined temperatures. If a subsequently determined temperature is above the temperature threshold, processor 10, in one embodiment, may discontinue varying power consumption of the temperature sensor until a lower temperature is subsequently determined.

Figure 8:
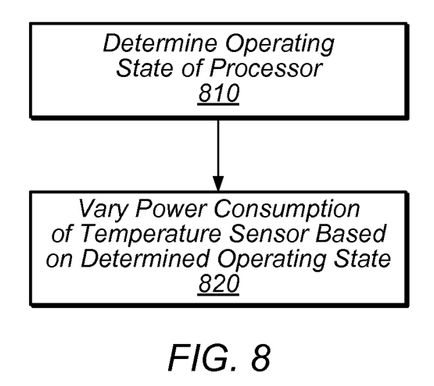
FIG. 8 is a flow diagram illustrating one embodiment of a method for controlling power consumption of a temperature sensor based, at least in part, on a determined operating state of a processor.

Turning now to FIG. 8, a flow diagram of a method 800 performed by processor 10 is depicted. Method 800 is another embodiment of a method for controlling power consumption of a temperature sensor. In some instances, performing method 800 can reduce power consumption of processor 10 by reducing the activity (and thus power consumption) of one or more sensors 114.

In step 810, a control unit (e.g., master control unit 130) determines an operating state of processor 10. In one embodiment, the operating state may correspond to a power state of processor 10. In one embodiment, the operating state may correspond to a performance state of processor 10. In some embodiments, the power state/performance state may be a C state/P state defined within the ACPI standard. In some embodiments, the determined operating state may be assigned to one or more processing cores within processor 10. In one embodiment, the control unit may determine the operating state by receiving an indication from an operating system that is being executed by processor 10.

In step 820, processor 10 varies power consumption of a temperature sensor (e.g., a sensor 114) based on the determined operating state. In one embodiment, processor 10 varies the power consumption by varying the sampling rate of the sensor based on the determined operating state. For example, processor 10 may select lower delay intervals (or higher sampling rates) for the sensor if the determined operating state is a higher performance state (e.g., performance state P0), and may select higher delay intervals (or lower sampling rates) if the determined operating state is a lower performance state (e.g., performance state P2). In various embodiments, processor 10 may vary the sampling rate of the sensor using the techniques described above. In one embodiment, if the determined operating state is a below a certain threshold, processor 10 varies the power consumption by permanently disabling the sensor (as opposed to cycling between enabled and disabled states) while processor 10 is at the determined operating state. For example, if a core of processor 10 transitions to a power state that is an idle power state (e.g., a power state of CC6 or lower), processor 10 may disable the sensor while the core remains in that power state. If that core subsequently transitions to a higher power state, processor 10 may re-enable the sensors in that core.

It is noted that, in various embodiments, methods 700 and 800 may be performed together. For example, in one embodiment, a temperature sensor of processor 10 may be measuring temperatures of a processing core in processor 10. Processor 10 may then begin varying power consumption of the temperature sensor based on a temperature determined by the sensor. If processor 10 then transitions that core to an operating state in which the core is, e.g., idle, processor 10 may then decide to disable that sensor while the core is at that operating state.

Exemplary Computer System

Figure 9:
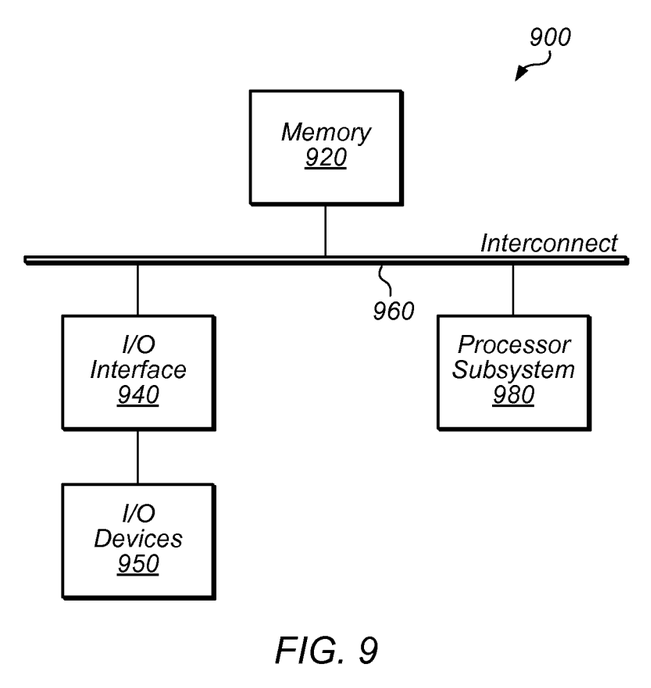
FIG. 9 is a block diagram illustrating one embodiment of an exemplary computer system.

Turning now to FIG. 9, one embodiment of an exemplary computer system 900, which may include processor 10, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 900 may also be any type of networked peripheral device such as storage devices, switches, modems, routers, etc. Although a single computer system 900 is shown for convenience, system 900 may also be implemented as two or more computer systems operating together.

Processor subsystem 980 may include one or more processors or processing units. For example, processor subsystem 980 may include one or more processing units (each of which may have multiple processing elements or cores) that are coupled to one or more resource control processing elements 920. In various embodiments of computer system 900, multiple instances of processor subsystem 980 may be coupled to interconnect 960. In various embodiments, processor subsystem 980 (or each processor unit or processing element within 980) may contain a cache or other form of on-board memory. In one embodiment, processor subsystem 980 may include processor 10 described above.

System memory 920 is usable by processor subsystem 980. System memory 920 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device.

Program instructions that are executed by computer systems (e.g., computer system 900) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, a computer-readable storage medium can be used to store instructions read by a program and used, directly or indirectly, to fabricate hardware for processor 10 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 10. The netlist may then be placed and routed to produce a data set describing geometric shapes to be applied to masks. The masks may then be used in various semiconductor fabrication steps to produce a semiconductor circuit or circuits corresponding to processor 10.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
a first temperature sensor configured to determine a first temperature of the integrated circuit and a subsequent, second temperature of the integrated circuit; and
wherein the integrated circuit is configured to reduce power consumption of the first temperature sensor based, at least in part, on a decrease in temperature indicated by the second temperature being less than the first temperature, and wherein the integrated circuit is configured to reduce the power consumption of the first temperature sensor without varying power consumption of at least a portion of the integrated circuit, wherein the integrated circuit is configured to reduce the power consumption of the first temperature sensor by disabling the first temperature sensor for an interval selected based on the second temperature.

2. The integrated circuit of claim 1, further comprising:
a first group of temperature sensors including the first temperature sensor, wherein the first group of temperature sensors is configured to determine a first set of temperatures of the integrated circuit;
wherein the integrated circuit is configured to:
determine a first temperature representative of the first set of temperatures; and
vary power consumption of the first group of temperature sensors based, at least in part, on the first representative temperature.

3. The integrated circuit of claim 2, further comprising:
a second group of temperature sensors configured to determine a second set of temperatures of the integrated circuit; and
wherein the integrated circuit is configured to:
determine a second temperature representative of the second set of temperatures; and
vary power consumption of the second group of temperature sensors based, at least in part, on the second representative temperature, and wherein the integrated circuit is configured to vary power consumption of the first group of temperature sensors independent of varying power consumption of the second group of temperature sensors.

4. The integrated circuit of claim 1, wherein the portion of the integrated circuit is a second temperature sensor configured to determine a second temperature of the integrated circuit.

5. The integrated circuit of claim 1, wherein the integrated circuit is configured to:
determine whether the interval is between a range; and
disable the first temperature sensor in response to the interval being within the range.

6. The integrated circuit of claim 5, wherein the integrated circuit further comprises a plurality of fuses that are blown to store maximum and minimum values for the range.

7. The integrated circuit of claim 1, wherein the integrated circuit is a processor that comprises:
a plurality of processing cores; and
wherein the integrated circuit is configured to determine an operating state for each processing core, and wherein the integrated circuit is further configured to vary the power consumption of the first temperature sensor based, at least in part, on the operating state of one of the plurality of processing cores.

8. An integrated circuit, comprising:
a first temperature sensor configured to determine a first temperature of the integrated circuit;
a second temperature sensor configured to determine a second temperature of the integrated circuit; and
wherein the integrated circuit is configured to, based on the first and second temperatures, temporarily disable the first temperature sensor without disabling the second temperature sensor, and wherein the integrated circuit is configured to temporarily disable the first sensor for an interval determined based on the first temperature.

9. The integrated circuit of claim 8, further comprising:
a group of temperature sensors including the first temperature sensor, wherein each temperature sensor in the group is configured to determine a respective temperature of the integrated circuit; and
wherein the integrated circuit is configured to disable the group of temperature sensors based on an average of the respective temperatures.

10. The integrated circuit of claim 8, further comprising:
a power regulator configured to supply power to the first temperature sensor; and
wherein the integrated circuit is configured to instruct the power regulator to restrict the power supplied to the first temperature sensor for the interval.

11. The integrated circuit of claim 8, further comprising:
a first sensor controller configured to vary power consumption of a first group of temperature sensors including the first temperature sensor; and
a second sensor controller configured to vary power consumption of a second group of temperature sensors including the second temperature sensor.

12. The integrated circuit of claim 11, further comprising:
a master control unit configured to instruct the first sensor controller and the second sensor controller to disable the first group of temperature sensors and the second group of temperature sensors.

13. A method, comprising:
a first temperature sensor measuring a first temperature and a second, subsequent temperature of an integrated circuit;
the integrated circuit selecting a delay interval, wherein the delay interval is selected based, at least in part, on the measured first and second temperatures; and
the integrated circuit reducing power consumption of the first temperature sensor by disabling the first temperature sensor for at least a portion of the selected delay interval.

14. The method of claim 13, further comprising:
a second temperature sensor measuring another temperature of the integrated circuit while the first temperature sensor is disabled; and
the integrated circuit determining a separate delay interval for the second temperature sensor based on the other measured temperature.

15. The method of claim 13, further comprising:
the integrated circuit changing an operating state of a processing core associated with the first temperature sensor from a first operating state to a second operating state; and
the integrated circuit disabling the first temperature sensor while the processing core is operating in the second operating state.

16. The method of claim 15, wherein the integrated circuit is a processor, and wherein the first and second operating states are different Advanced Configuration and Power Interface (ACPI) states.

17. The method of claim 13, further comprising:
the integrated circuit changing a sampling rate of an analog-to-digital converter (ADC) of the first temperature sensor based on the measured temperature.

18. A computer readable storage medium comprising a data structure which is operated upon by a program executable on a computer system, the program operating on the data structure to perform a portion of a process to fabricate an integrated circuit including circuitry described by the data structure, the circuitry described in the data structure including:

a sensor controller configured to receive, from a temperature sensor, a first temperature of the integrated circuit and a subsequent, second temperature of the integrated circuit; and wherein the sensor controller is configured to reduce power consumption of the temperature sensor based, at least in part, on a decrease in temperature indicated by the second temperature being less than the first temperature, and wherein the sensor controller is configured to reduce the power consumption of the temperature sensor without varying power consumption of at least a portion of the integrated circuit, wherein the integrated circuit is configured to reduce the power consumption of the temperature sensor by disabling the temperature sensor for an interval selected based on the second temperature.

19. The computer readable storage medium of claim 18, wherein the storage medium stores hardware description language (HDL) data, Verilog data, or graphic database system II (GDSII) data.

* * * * *